E. Stearns,
Windlass.
No. 43,234.    Patented June 21, 1864.
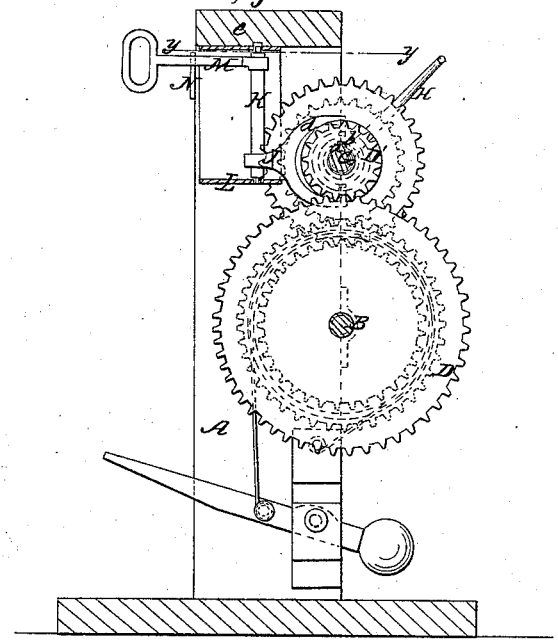
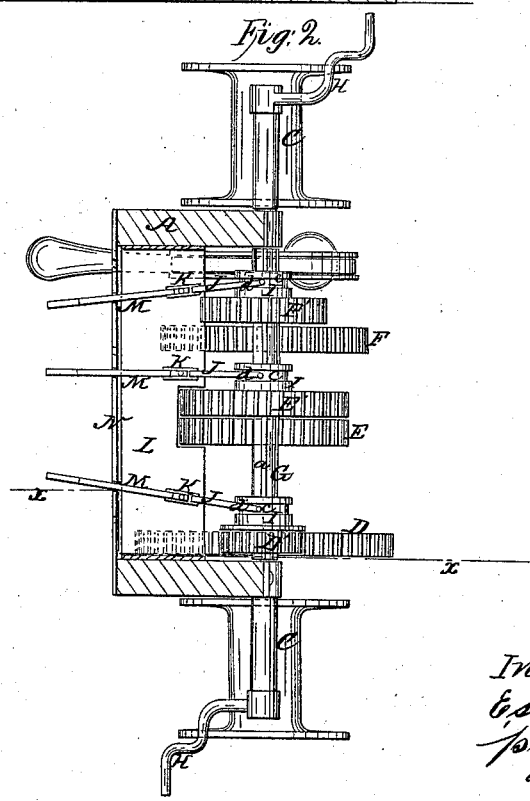
Witnesses.
Henry Morris,
Geo. W. Reed
Inventor.
E. Stearns
per Munn & Co.
Attorneys

UNITED STATES PATENT OFFICE.

E. STEARNS, OF BROOKLYN, NEW YORK.

IMPROVEMENT IN WINDLASSES.

Specification forming part of Letters Patent No. 43,234, dated June 21, 1864.

*To all whom it may concern:*

Be it known that I, E. STEARNS, of Brooklyn, in the county of Kings and State of New York, have invented a new and Improved Windlass; and I do hereby declare that the following is full, clear, and exact description thereof, which will enable any person skilled in the art to make and use the same, reference being had to the accompanying drawings, in which—

Figure 1 is a side sectional view of my invention, taken in the line $x\ x$, Fig. 2; Fig. 2, a horizontal section of the same, taken in the line $y\ y$, Fig. 1.

Similar letters of reference indicate like parts.

This invention consists in providing the driving-shaft of a windlass with a series of shifting or adjustable wheels of different diameters, in connection with a series of wheels placed on the drum-shaft, and also of different diameters, the adjustable wheels being moved by levers, and all arranged in such a manner that the driving-shaft may be made to communicate motion to the drum-shaft through the medium of gearing, which may be varied or changed according to the power required.

A represents a framing, which may be constructed in any proper manner to support the working parts, and B is a shaft, which is fitted horizontally in said framing, and is provided with a drum, C, at each end, on which drums the windlass chains or ropes wind.

On the shaft B there are securely keyed a series of toothed wheels, D E F, of different diameters, and in the framing A, above the shaft B, there is a shaft, G, on which a series of toothed wheels, D' E' F', are placed and allowed to slide freely, said wheels being fitted on the shaft by means of a feather, $a$, on the shaft, and grooves $b$ in the wheels, which admit of the latter sliding on G, but still cause said wheels to turn with the shaft. On each end of the shaft G there is a crank, H.

Each wheel D' E' F' has a hub, I, attached to it, in which a groove, $c$, is made circumferentially, and in these grooves $c$ the forks $d$ of arm J are attached to the lower parts of vertical shafts K, the lower ends of which are fitted or stepped in a horizontal bar, L, in the framing, the upper ends of said shafts having their bearings in the under side of the top plate, $e$, of the framing. (See Fig. 1.) Each shaft K has a horizontal arm, M, attached to it near its upper end, and these arms work over a notched plate, N, attached to the framing, said notches securing the arms M in different positions.

The wheels D' E' F' on the shaft G have not only different diameters with respect to each other, but also with respect to the wheels D E F on the shaft B, and by adjusting the arms M the wheels D' E' F' on the shaft G, may be moved, and any one of them thrown in gear with the wheel below on the drum-shaft B, or thrown out of gear with said wheel. Thus it will be seen that the drum-shaft B may be turned with a geater or less speed, and with a corresponding proportion of power, as circumstances may require. The wheels on the two shafts B G are retained in and out of gear by placing the arms M in the proper notches in the plate N.

The arrangement is extremely simple, and will prove very advantageous, as power may be obtained when power is required, as in raising heavy articles, and power dispensed with or diminished and a proportionate amount of speed obtained when light weights are to be raised.

Having thus described my invention, what I claim as new, and desire to secure by Letters Patent, is—

1. The windlass, constructed and arranged as hereinbefore described, with two shafts, provided each with a series of wheels, the wheels of one shaft varying in diameter relatively with each other, and also varying in diameter with respect to the wheels of the other shaft, and the wheels of one shaft being adjustable, so that the two shafts may be connected by gearing varying in diameter relatively with each, in order to increase or diminish the power and speed of the drum-shaft as circumstances may require, in combination with means, substantially as described, for adjusting the wheels.

2. The arrangement of the shafts K, arms J M, and the notched plate N, for adjusting the wheels D' E' F' and securing them in the desired position, substantially as set forth.

E. STEARNS.

Witnesses:
WM. F. MCNAMARA,
M. M. LIVINGSTON.